United States Patent
Sharifi

(10) Patent No.: US 9,323,770 B1
(45) Date of Patent: Apr. 26, 2016

(54) FINGERPRINT MERGING AFTER CLAIM GENERATION

(71) Applicant: Google Inc., Mountain View, CA (US)

(72) Inventor: Matthew Sharifi, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 14/099,527

(22) Filed: Dec. 6, 2013

(51) Int. Cl.
G06F 17/30 (2006.01)

(52) U.S. Cl.
CPC .............. *G06F 17/30109* (2013.01)

(58) Field of Classification Search
CPC .............. G06F 17/30743; G06F 17/30784
See application file for complete search history.

(56) References Cited

U.S. PATENT DOCUMENTS

| | | | |
|---|---|---|---|
| 8,212,135 B1 | 7/2012 | Sharifi et al. | |
| 8,433,577 B2 | 4/2013 | Sharifi et al. | |
| 2003/0086341 A1* | 5/2003 | Wells | G06F 17/30017 369/13.56 |
| 2004/0122679 A1* | 6/2004 | Neuhauser | H04H 20/33 704/500 |
| 2004/0172411 A1* | 9/2004 | Herre | G06F 17/30743 |
| 2013/0162902 A1* | 6/2013 | Musser, Jr. | G11B 27/10 348/515 |

OTHER PUBLICATIONS

U.S. Appl. No. 13/296,899, filed Nov. 15, 2011, entitled, "Frequency Ratio Fingerprint Characterization for Audio Matching," 21 pages.
U.S. Appl. No. 13/450,427, filed Apr. 18, 2012, entitled, "Full Digest of an Audio File for Identifying Duplicates," 24 pages.
U.S. Appl. No. 13/239,138, filed Sep. 21, 2011, entitled, "Inverted Client-Side Fingerprinting and Matching," 27 pages.
U.S. Appl. No. 14/019,086, filed Sep. 5, 2013, entitled, "Multi-Channel Audio Video Fingerprinting," 34 pages.

* cited by examiner

*Primary Examiner* — Syed Hasan
(74) *Attorney, Agent, or Firm* — Fenwick & West LLP

(57) ABSTRACT

A media item fingerprint consolidation system is described that merges fingerprints into a consolidated fingerprint. Fingerprints can be generated to compactly represent media items. Fingerprints of common media items can be merged to generate a consolidated fingerprint that compactly represents the common media items. The consolidated fingerprint can replace existing fingerprints.

14 Claims, 10 Drawing Sheets

FINGERPRINT MERGING AFTER CLAIM GENERATION

TECHNICAL FIELD

This disclosure relates generally to receiving and processing media content streams for merging reference content, and in particular merging versions of media and video sections that are nearly identical.

BACKGROUND

Media fingerprinting provides an ability to link short, unlabeled, snippets of media content to corresponding data. It provides the ability to automatically identify and cross-link media, such as audio and video. Unlike many competing technologies, a goal of media fingerprinting is to perform recognition without imposing extraneous hardware restraints to automatic detection and/or replacement, as well as without extraneous data transmission Fingerprints or descriptors can then be derived from features computed over the reference samples. Fingerprints of a media item can then be compared to fingerprints of reference samples to determine identity of the media item.

Various challenges are posed when systems do not function with exact bit-level matches when comparing content. The system may be functioning with multiple media items that are identical or nearly identical. Because media items can comprise varied content but relate to a common media item, multiple fingerprints are stored. Additionally, there are difficulties introduced through the numerous forms of playback available to the end consumer. Media that is played through a cell phone, computer speakers, or high-end media equipment will have very different characteristics.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to merging fingerprints of a media items (e.g., a media track, a video, etc.) received at a server. The server performs matching operations at a reference database to determine the various matching references of the fingerprint against references (e.g., other media items). If the fingerprint is determined to match the reference within a determined variance, the fingerprint is merged with the reference. If the fingerprint is determined to be sufficiently different (e.g., is not within a threshold variance) the media item and/or a portion of the media item is stored as a disparate reference.

In one example of an embodiment, a system comprises a memory that stores computer executable components. A processor executes the computer executable components stored in the memory. A receiving component receives a first fingerprint associated with a media file (e.g., from a client device or from a data store). A comparing component generates a comparison of the first fingerprint to reference fingerprints associated with reference media files to identify matching reference fingerprints. A consolidation component determines a whether the first fingerprint matches the reference fingerprint and merges, based on the determination, the first fingerprint with the reference fingerprint to generate a consolidated fingerprint.

Another example of an embodiment includes a method that uses a processor to execute computer executable instructions stored in a memory to perform the acts. The method includes receiving a first fingerprint associated with a media file. The first fingerprint is compared to reference fingerprints associated with reference media files to identify matching reference fingerprints. In response to identifying the matching reference fingerprints, the first fingerprint and the reference fingerprint are temporally synchronized and the first fingerprint and the reference fingerprint are merged to generate a consolidated fingerprint.

Also disclosed herein is a method using a processor to execute computer executable instructions of a memory that includes receiving a first fingerprint associated with a probe media file that is communicated from a client device. The first fingerprint is compared to reference fingerprints associated with reference media files to identify a set of matching reference media files having matching reference fingerprints. A consolidated fingerprint is generated based on a merge of the first fingerprint and matching reference fingerprints.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
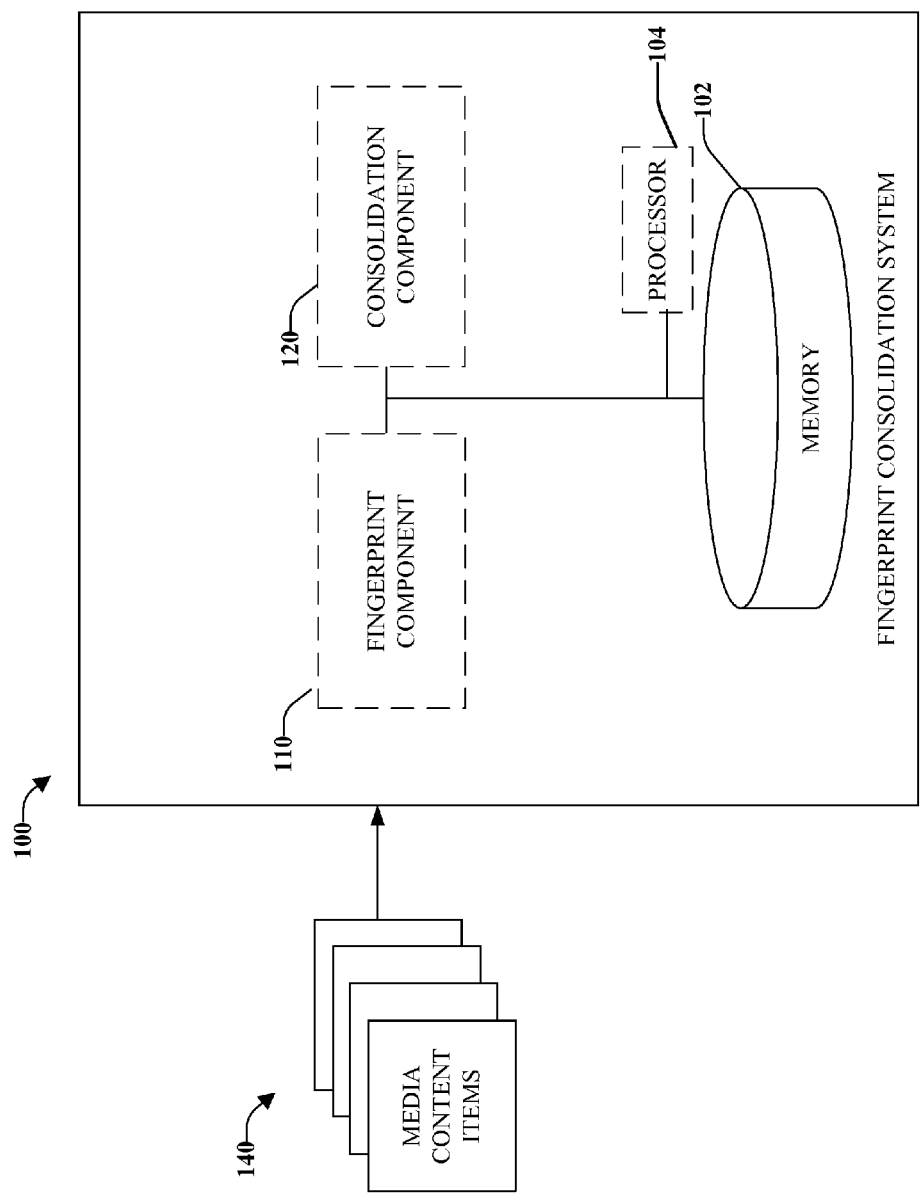
FIG. 1 is a block diagram illustrating an example, non-limiting embodiment of a media item fingerprint merging system in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

In accordance with one or more implementations described in this disclosure, a content matching system can include matching schemes based on receiving fingerprints for media items (e.g., songs, music recordings, album tracks, or videos) and identifying the digests among a set of media references. For example, a compact digest can be generated based on sets of groupings of interest points that meet threshold criteria. The compact descriptors ("fingerprints") can be used in identifying a potential media item match. One method of calculating fingerprints is to first calculate individual interest points that identify unique characteristics of local features of the time-frequency representation of the reference sample. Fingerprints can then be computed as functions of sets of interest points.

Calculating interest points involves identifying unique characteristics of a spectrogram. For example, an interest point can be a spectral peak of a specific frequency over a specific window of time. As another non-limiting example, an interest point can also include timing of the onset of a note. Any suitable unique spectral event over a specific duration of time can constitute an interest point.

A media item match can be determined, for example, by analyzing a media or video for unique characteristics that can be used in comparison to unique characteristics among one or more reference media items or fingerprints among a data store. A spectrogram or a window of a spectrogram, for example, can be also used in the comparison of the video/media to identify a video/media sample, in which the spectrogram represents a video/media sample by plotting time on one axis and frequency or other parameter on another axis.

Because storing an entire spectrogram for multiple reference samples may not be efficient, compact descriptors of reference samples can be utilized to identify near duplicates or nearly identical versions of the same media item. Even though a variety of references could be near matches, only one of them can be a correct match. In a media matching system, for example, the system can match the media of a sample, e.g., a user uploaded video/media clip, against a set of references, allowing for a match in any range of the probe sample and a reference sample. Thus, descriptors of the sample are generated based on snapshots (or subsets of correlated sample data—e.g., a spectrogram window) of the sample at different times, which are looked up in an index of corresponding snapshots (or fingerprints) from reference samples. When a sample has multiple matching snapshot pairs, they can be combined during matching to time align the sample and reference sample and generated a consolidated fingerprint.

In some media matching systems, the system can be tuned to match the entirety of a media clip, e.g., finding full duplicates. For example, a media matching system can be used to discover the identity of a full media item in a user's collection of media against a reference database of known media items. Such a system could be useful for any cloud media service to allow a user to match their collection against a set of known media items. In another example, a media matching system can be used to discover duplicates within a large data store or collection of media subsets, for example. In yet another example, a media matching system can be used for clustering together multiple user recordings. Using descriptors capable of matching any range of a probe sample to any range of a reference sample, could work for the previous examples; however, using more compact descriptors for the purpose of matching an entire media subset (e.g., song track, or the like or digest of media subsets) can be more efficient and allow the system to scale to billions of reference samples.

It is noted that a media item, as used herein, can generally refer to a performable media item. A performable media item can include a video file, an audio file, an image file, and the like. Unless context suggests otherwise, a media item is understood to comprise one or more types of performable media items. It is noted that a reference to a particular type of media item is understood to encompass other types of video items.

Turning now to FIG. 1, illustrated is an example system 100 for media item fingerprint merging in accordance with various aspects described in this disclosure. Generally, system 100 can include a memory 102 that stores computer executable components and a processor 104 that executes computer executable components stored in the memory. System 100 can primarily include a fingerprint component 110 and a consolidation component 120. The fingerprint component 110 recognizes, identifies, or otherwise determines a fingerprint of a media item 140 (e.g., a video item) received from a client device, media store, and the like. The consolidation component 120 can consolidate a first fingerprint associated with a media item with a reference fingerprint associated with a reference media item. The consolidation component 120, for example, can include media data, such as, songs, speeches and videos, for example. For example, in one implementation, the consolidation component 120 can include a video performance of a song uploaded to a media hosting service by a user, and fingerprint component 110 can generate a fingerprint of the media item.

The fingerprint component 110 can operate to receive a portion or subset of data corresponding to a media item 140. The fingerprint component 110 can determine compact descriptors (e.g., a fingerprint) of the media item 140. It is noted that the media item can be received from a client device, a server, a data store, and the like.

In one embodiment, the fingerprint component 110 operates at a server or as a server, and in response to receiving the media item 140, generates a fingerprint. The fingerprint component 110 can utilize phase shifting and the like to generate a fingerprint of the media item 140. It is noted that a fingerprint can be generated utilizing virtually any fingerprinting technique. In implementations, the fingerprint component 110 can select a fingerprinting technique, utilized in generation of a reference fingerprint, for generating fingerprint items.

In another embodiment, fingerprint component 110 can receive a fingerprint of media item 140. The fingerprint can comprise metadata or can be independently received without the media item. In another aspect, fingerprint component 110 can generate a new fingerprint based on a fingerprinting technique, utilized in generation of a reference fingerprint, for generating fingerprint items.

Consolidation component 120 can consolidate a received fingerprint (e.g., from fingerprint component 110) with a reference fingerprint item associated with a disparate media item. In an aspect consolidation component 120 can determine a match or near match between a first fingerprint (e.g., a received fingerprint) and a reference fingerprint. If the first fingerprint and the reference fingerprint are within a variance level, the consolidation component 120 can merge the first fingerprint and the reference fingerprint into a consolidated fingerprint.

In another aspect, consolidation component 120 can replace, alter, and/or modify fingerprints based on the consolidated fingerprint. For example, if the consolidation component 120 determines to generate a consolidated fingerprint, the consolidated fingerprint can replace a stored fingerprint associated with media item 140 and/or a reference media item.

Figure 2:
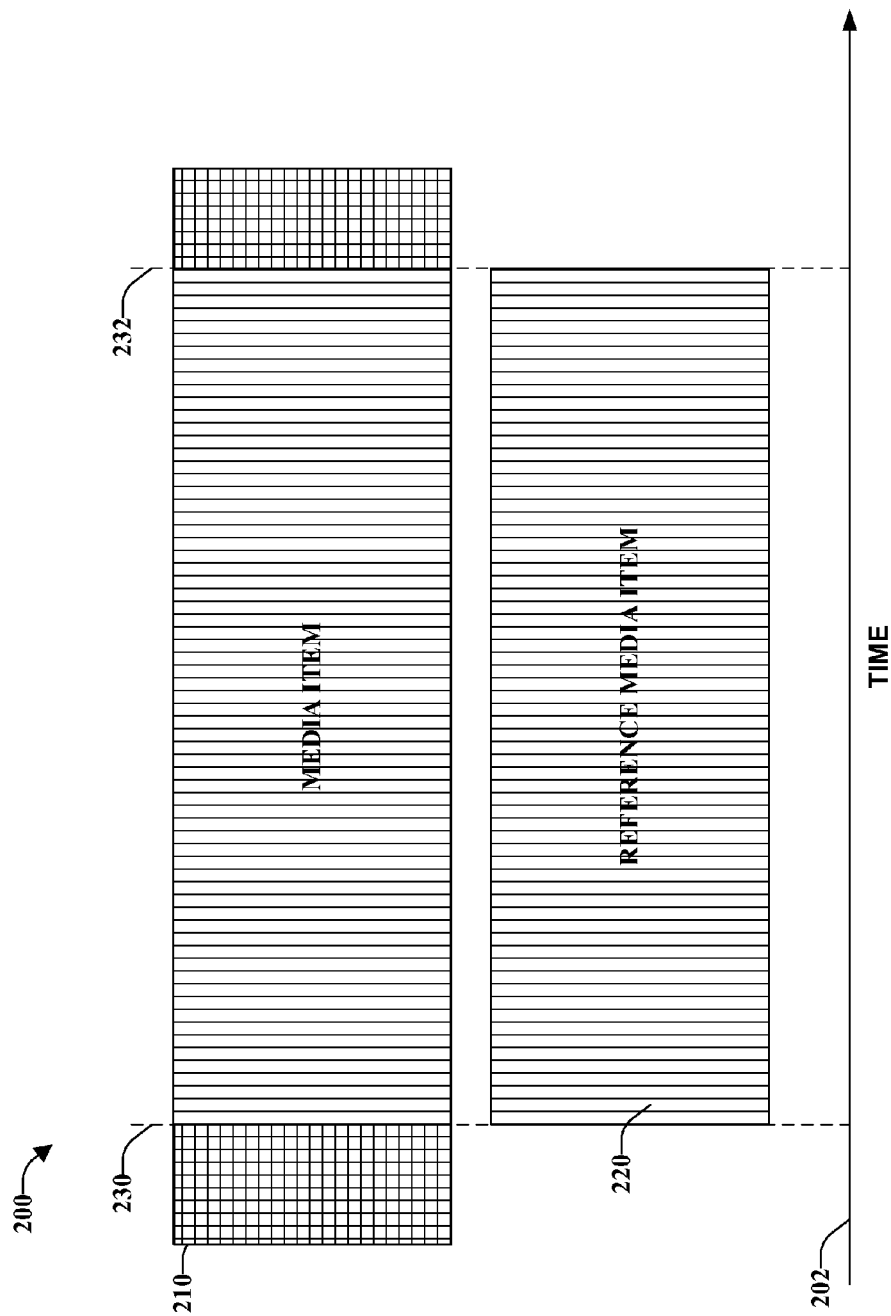
FIG. 2 depicts an example illustration of a reference item and a media item to be merged in accordance with certain embodiments of this disclosure.

With reference to FIG. 2, there depicted is a set of media items 200 associated with a consolidated fingerprint. As depicted, media item 210 can represent media item 140 and reference media item 220 can represent a reference media item determined to be associated with media item 140. In an aspect, media item 210 and reference media item 220 are determined to relate to a common media item based on input, metadata, an analysis of the media items, and/or associated fingerprints.

Turing back to FIG. 1 with reference to FIG. 2, the fingerprint component 110 can generate and/or receive fingerprints of media item 210 and reference media item 220. The consolidation component 120 can temporally align media item 210 and media item 220 along a time line 202 (e.g., through matching of media item content, matching of fingerprint data, and the like). In another aspect, the consolidation component 120 can determine that media item 210 contains data not comprised in media item 220. For example, media item 210 and reference media item 220 can each contain a video of a performance in between time 230 and time 232. Media item 210 can comprise additional data, represented by shading, before and after time 230 and 232 respectively. As an example, media item 210 can contain a portion of a commercial before and after a clip of a video while, media item 220 contains only the clip.

The consolidation component 120 can determine to merge a fingerprint of media item 210 and a reference fingerprint of media item 220 if the fingerprints are within a determined variance range. For example, the consolidation component 120 can determine media item 210 and reference media item 220 are within a defined level of similarity or whether the media items are distinct enough to have disparate fingerprints. In response to determining the media items have a level of similarity, consolidation component 120 can merge the fingerprints to generate a consolidated fingerprint. It is noted that generating the consolidating fingerprint can comprise merging select data of each fingerprint and/or replacing a fingerprint. For example, continuing with reference to FIG. 2, consolidation component 120 can select a fingerprint of media item 210 as a consolidated fingerprint as the fingerprint comprises additional data not necessarily comprised by the fingerprint of media item 220.

In an implementation, consolidation component 120 can determine whether a first media item comprises additional data in comparison to a second media item. For example, the consolidation component 120 can determine that media item 210 comprises content before time 230 and/or after time 232 that is not comprised in the reference media item 220. In an aspect, consolidation component 120 can determine to append sub-fingerprints, associated with the content not comprised in the reference media item 220, to a merged fingerprint. It is noted that the consolidation component 120 can determine whether to append the sub-fingerprints based on a variance between the sub-fingerprints and other sub-fingerprints of the merged fingerprint. For example, media item 210 can represent a video clip and the content before and/or after times 230 and 232, respectively, can represent a commercial. Accordingly, the content and sub-fingerprints associated with the commercials may be very different to the content of the main video and may be undesirable for the merged fingerprint.

It is noted that the reference media item 220 can include media objects that are similarly encoded, such as with feature vector hashes, compacted digests or fingerprints, full fingerprints, spectrograms, and/or the like to provide corresponding comparison.

Figure 3:
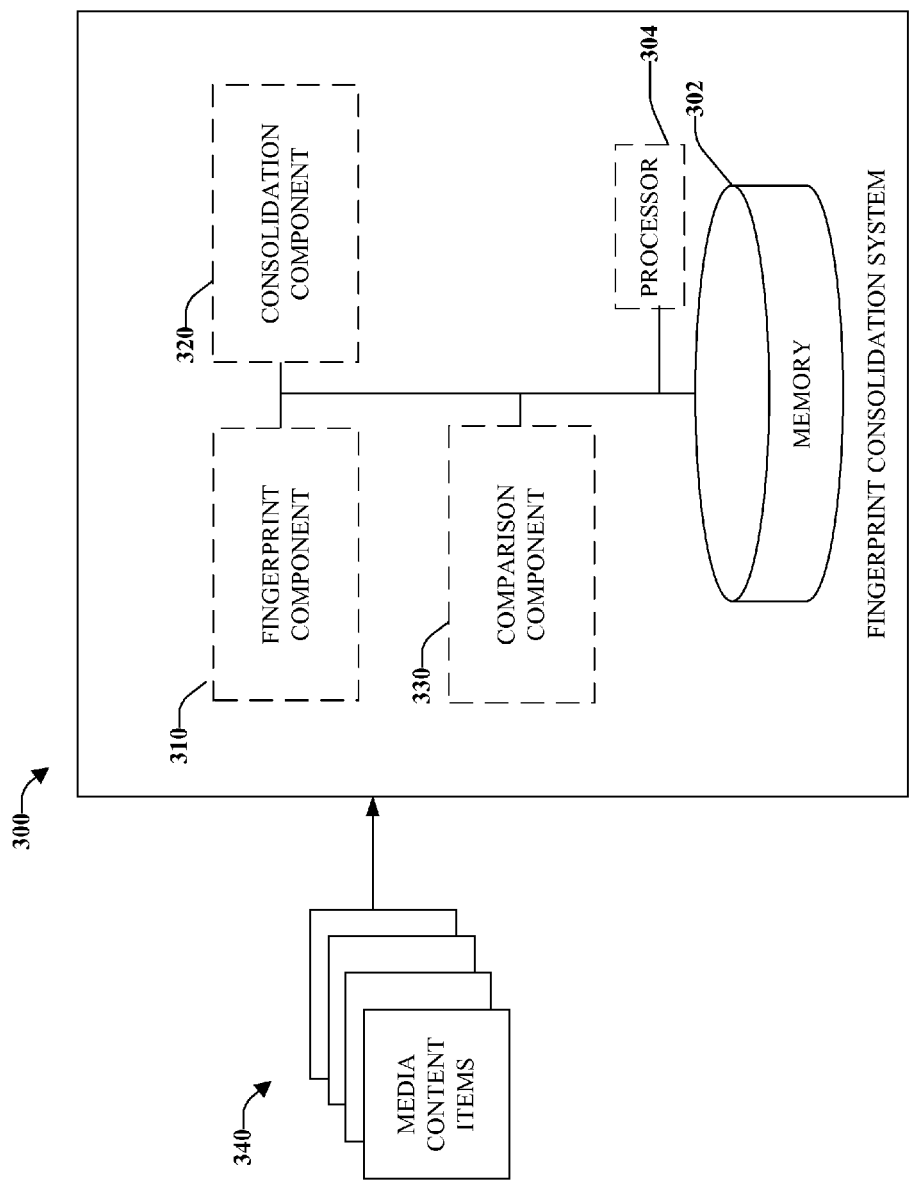
FIG. 3 is a block diagram illustrating an example, non-limiting embodiment of a media item fingerprint merging system with a comparison component in accordance with various aspects and implementations described herein.

Turning now to FIG. 3, illustrated is an example system 300 for media item fingerprint merging in accordance with various aspects described in this disclosure. Generally, system 300 can include a memory 302 that stores computer executable components and a processor 304 that executes computer executable components stored in the memory. System 300 can primarily include a fingerprint component 310 (which can generate fingerprints of media items 340), a consolidation component 320 (which can generate a consolidated fingerprints), and a comparison component 330 (which can compare media items, fingerprints, and the like). It is noted that fingerprint component 310 and consolidation component 320 can respectively function substantially similar to fingerprint component 110 and consolidation component 120 of FIG. 1.

The comparison component 330 can compare media items 340 and/or representations of media items 340, such as fingerprints. In an aspect, comparison component 330 can compare metrics of media items 340 such as length, color parameters, noise parameters, and the like. In an aspect, comparison component 330 can normalize media items 340 and/or reference media items (e.g., from a data store) to eliminate noise data, alter data describing media items based on a criterion (e.g., match brightness levels, etc.)

In another aspect, the comparison component 330 can compare the media items 340, reference media items, and/or associated fingerprints of media items (e.g., such as fingerprints received from fingerprint component 310). As an example, the comparison component 330 can perform a bitwise comparison of media items 340 and reference items to determine whether the media 340 items and/or reference items are related to a common media item. It is noted that comparison component 330 can compare fingerprints and/or other representations of media items to determine if they are associated with a common media item (e.g., song, video, . . . ).

The comparison component 330 can generate a variance metric that describes a level of difference between two or more media items and/or fingerprints. With reference to FIG. 2, comparison component 330 can compare the media item 210 and the reference media item 220 and/or compare associated fingerprints. The comparison component 330 can determine a level of difference based on one or more criterion describing the media items/fingerprints.

The consolidation component 320 can determine whether to consolidate fingerprints based on the level of difference meeting a defined criterion. For example, the consolidation component 320 can determine to merge fingerprints if the fingerprints or media items are within a defined range of variance. If the fingerprints of media items exceed a defined range of variance, the consolidation component 320 can determine to forego merging.

In an implementation, the consolidation component 320 can generate the consolidated fingerprint based on the variance metric and/or difference level. For example, the consolidation component 320 can determine to select a fingerprint associated with media item 340 and/or a reference fingerprint as the consolidated fingerprint if the variance level is below a defined threshold. As an example, if a media item and a reference item are sufficiently similar the consolidation component 320 can determine that a fingerprint associated with either the media item or the reference item is to be utilized as the consolidated fingerprint. In another aspect, if a media item and a reference item are sufficiently different, the consolidation component 320 can determine to merge respective fingerprints such that a consolidated fingerprint comprises data from each of the respective fingerprints.

In another implementation, the comparison component 330 can compare media items associated with a consolidated fingerprint. The comparison component 330 can prune the consolidated fingerprint to generate a new consolidated fingerprint. For example, if a consolidated fingerprint becomes to robust and is associated with too many media items, the comparison component 330 can remove select media items that fall outside a defined variance level. The fingerprint component 310 can determine fingerprints of the removed media items and the consolidation component 320 can determine an updated consolidated fingerprint.

In another aspect, the comparison component 320 can match media items by computing a sequence of overlapping spectrogram frames, measuring a distance between normalized frames, and can generate a sequence of feature vectors. These detailed fingerprints or sequence of feature vectors can be compared utilizing a Hamming distance, or some other distance measure. In an example, the comparison component can generate a similarity matrix by performing a comparison of all possible pairs of the matching references in time sequences of i and j, where i and j are numbers. A main diagonal flows from the time origin (0, 0) to (i,j), which flows from bottom right to top left with respect to time. Encoded are similarities between the features or hashes of the features that correspond to time space or time based signals. A feature vector is computed for each time i and j, in which the vectors are compared and computed independently, either together or at separate times. The alignments between the two references are identified by accumulating similarities for the same i-j. A maximum i-j (projection) is taken to find the starting indices i_start in ref_1 and j_start in ref_2. Each time indices along the main diagonal analyzed and the time indices with no match are store for the respective instance in time. For example, a disruption represents a region of discrepancy or a discriminative region, which indicates dissimilarity with respect to time at time indicia i and j.

Figure 4:
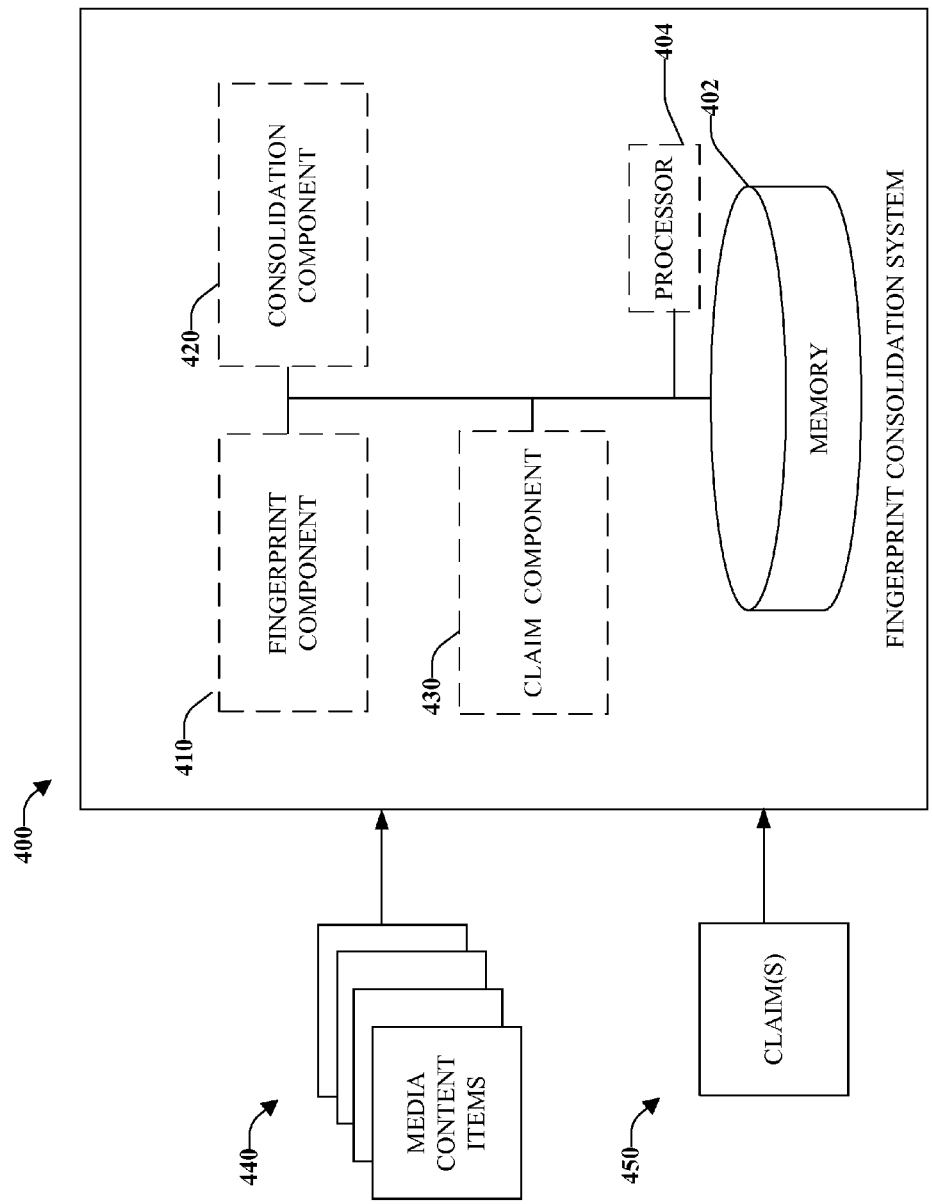
FIG. 4 is a block diagram illustrating an example, non-limiting embodiment of a media item fingerprint merging system with a claim component in accordance with various aspects and implementations described herein.

Referring now to FIG. 4, illustrated is an example system 400 for media item fingerprint merging in accordance with various aspects described in this disclosure. Generally, system 400 can include a memory 402 that stores computer executable components and a processor 404 that executes computer executable components stored in the memory. System 400 can primarily include a fingerprint component 410 (which can generate fingerprints of media items 440), a consolidation component 420 (which can generate a consolidated fingerprints), and a claim component 430 (which can process claims associated with media items 440 and reference items). It is noted that fingerprint component 410 and consolidation component 420 can respectively function substantially similar to fingerprint component 110 and consolidation component 120 of FIG. 1.

The claim component 430 can process a claim 350 to a media item. A claim 350 to a media item can be determined based on user input. As an example, a media item can be uploaded to a content hosting website. An entity (such as a user, an author, and the like) can provide input claiming the media item as being authored by or belonging to the entity. The consolidation component 420 can consolidate a first fingerprint of a first media item and a second fingerprint of a media item claimed by the entity. In response to the first fingerprint and the second fingerprint being merged, the claim component 430 can generate a claim to the first media item or a portion of the first media item. As an example, the first media item can comprise a user-uploaded video that contains a song in the background of the video, and the claim component 430 can generate a claim for the song that comprises a portion of the data describing the first media item (e.g., a portion of a full fingerprint of the first media item). As another example, the first media item can comprise video clip of a television show. Based on a claim to a reference media item, the claim component 430 can generate a claim to the video clip and/or a fingerprint of the video clip.

In another aspect, the claim component 430 can consolidate claims to media items. For example, the claim component 430 can, based on the consolidation component merging fingerprints, can merge claims. In an aspect, merging claims can comprise generating a list of related claimed media items, embedding data in media items identifying a common claim, and the like.

Figure 5:
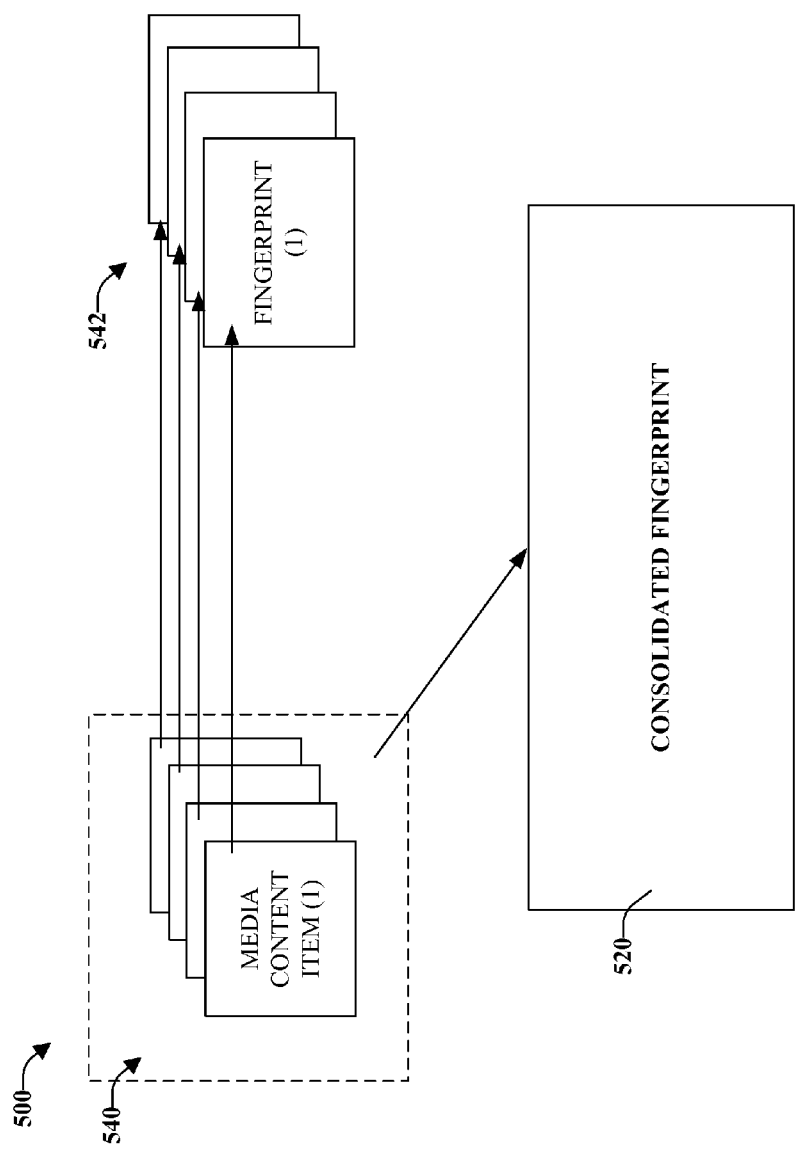
FIG. 5 depicts an example illustration of a relationship between media items and fingerprints in accordance with certain embodiments of this disclosure.

Referring to FIG. 5, illustrated is an illustration 500 depicting relationships between media items and fingerprints in accordance with various embodiments disclosed. It is noted that systems 100, 300 and 400 of FIGS. 1, 3 and 4, respectively, can generate consolidated fingerprint 520 based on fingerprints 542 that are associated with media items 540.

In an implementation, a fingerprint component (e.g., fingerprint component 110, 310, or 410) can generate a fingerprint for each media item of the set of media items 540. Each media item can relate to a respective fingerprint of the set of fingerprints 542. It is noted that a fingerprint component can generate fingerprints 542 simultaneously, substantially simultaneously or at disparate times. It is further noted that a consolidation component (e.g., consolidation component 120, 320, or 420) can generate consolidated fingerprint 520 based on combing two or more of fingerprints 542 and/or reference fingerprints. For example, a consolidation component can generate consolidated fingerprint 520 by combing all the fingerprints 542 simultaneously in a batch consolidation technique. In another aspect, a consolidation component can generate a series of consolidated fingerprints with a final result of consolidated fingerprint 520.

In an aspect, the consolidated fingerprint 520 can be associated with each media item of the set of media items 540. As an example, consolidated fingerprint 520 can replace the set of fingerprints 542 and the set of fingerprints 542 can be discarded, archived, or otherwise removed.

Figure 6:
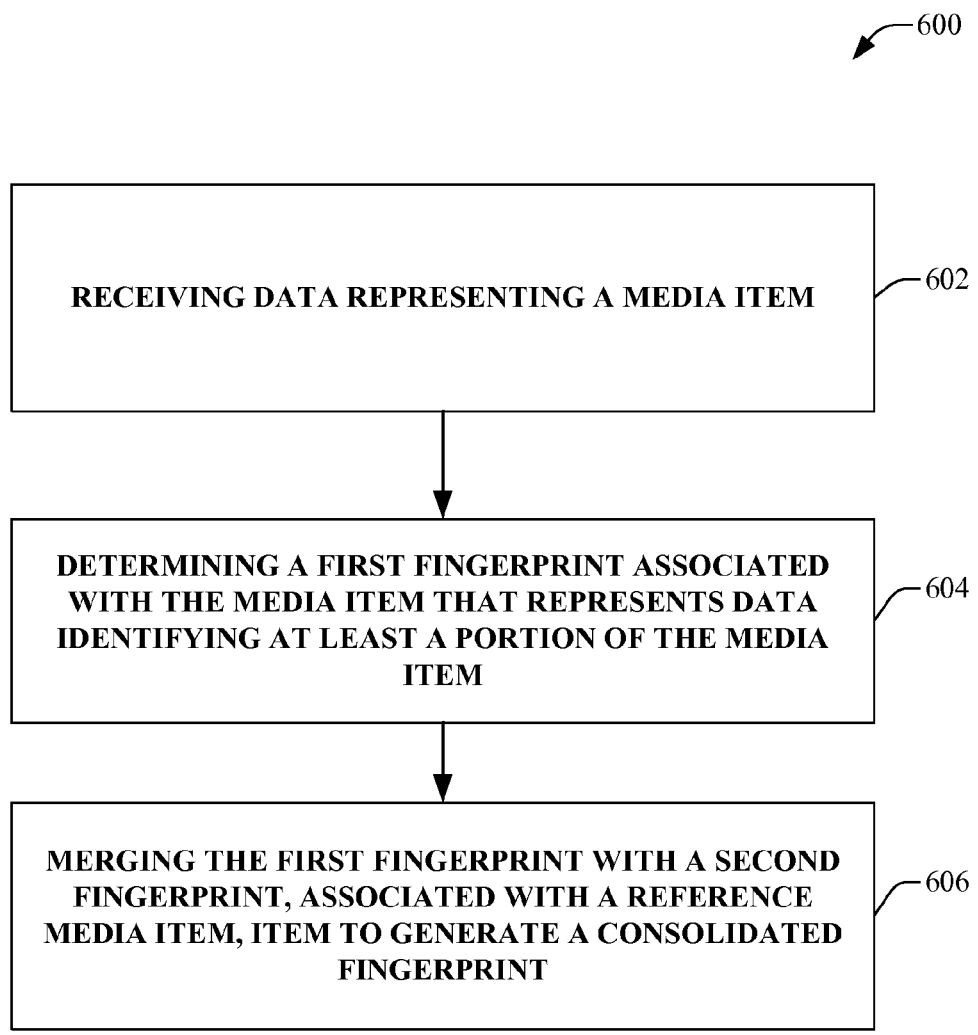
FIG. 6 illustrates a flow diagram of an example, non-limiting embodiment for merging fingerprints in accordance with various aspects and implementations described herein.
Figure 7:
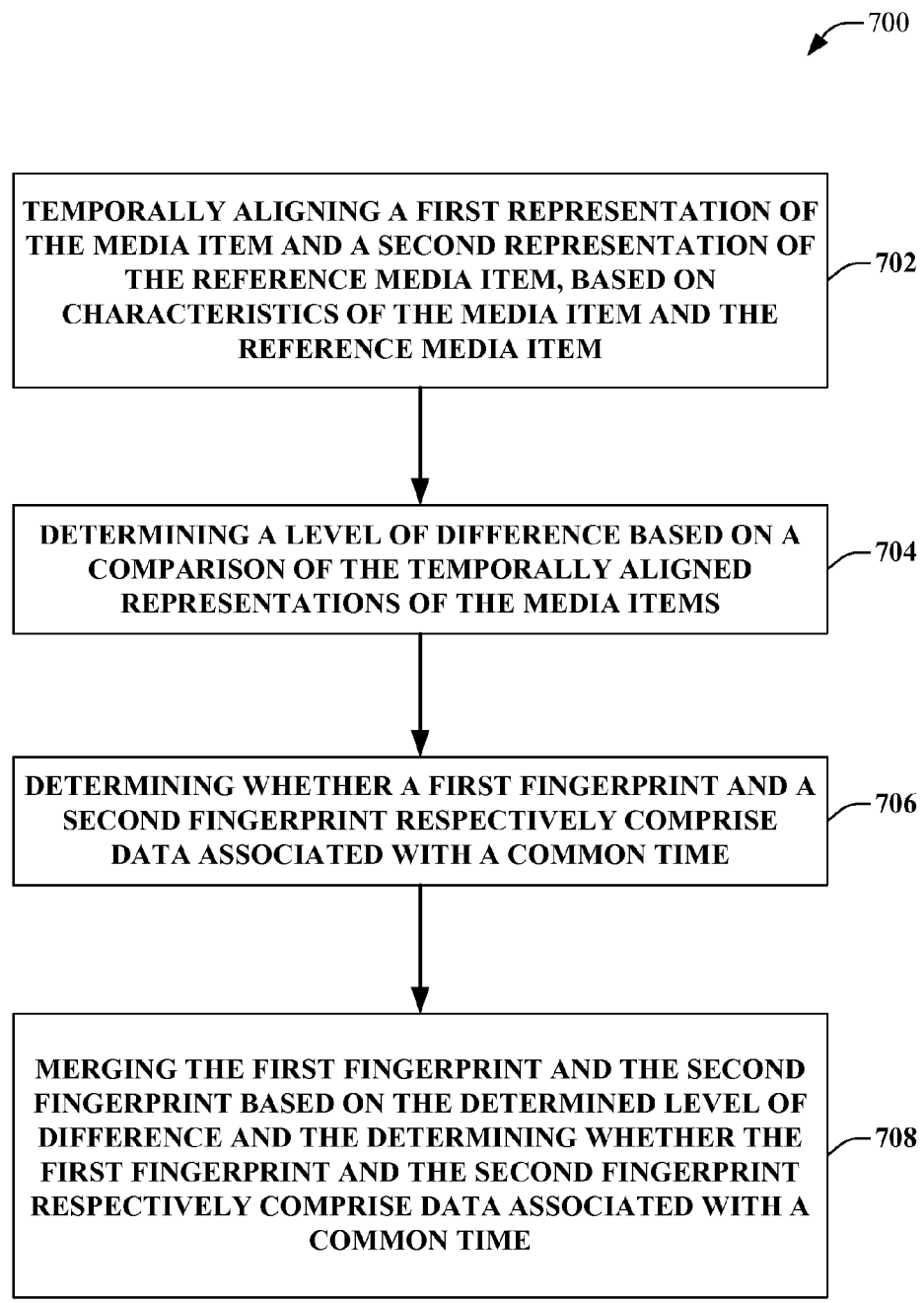
FIG. 7 illustrates a flow diagram of an example, non-limiting embodiment for merging fingerprints and comparing media items in accordance with various aspects and implementations described herein.
Figure 8:
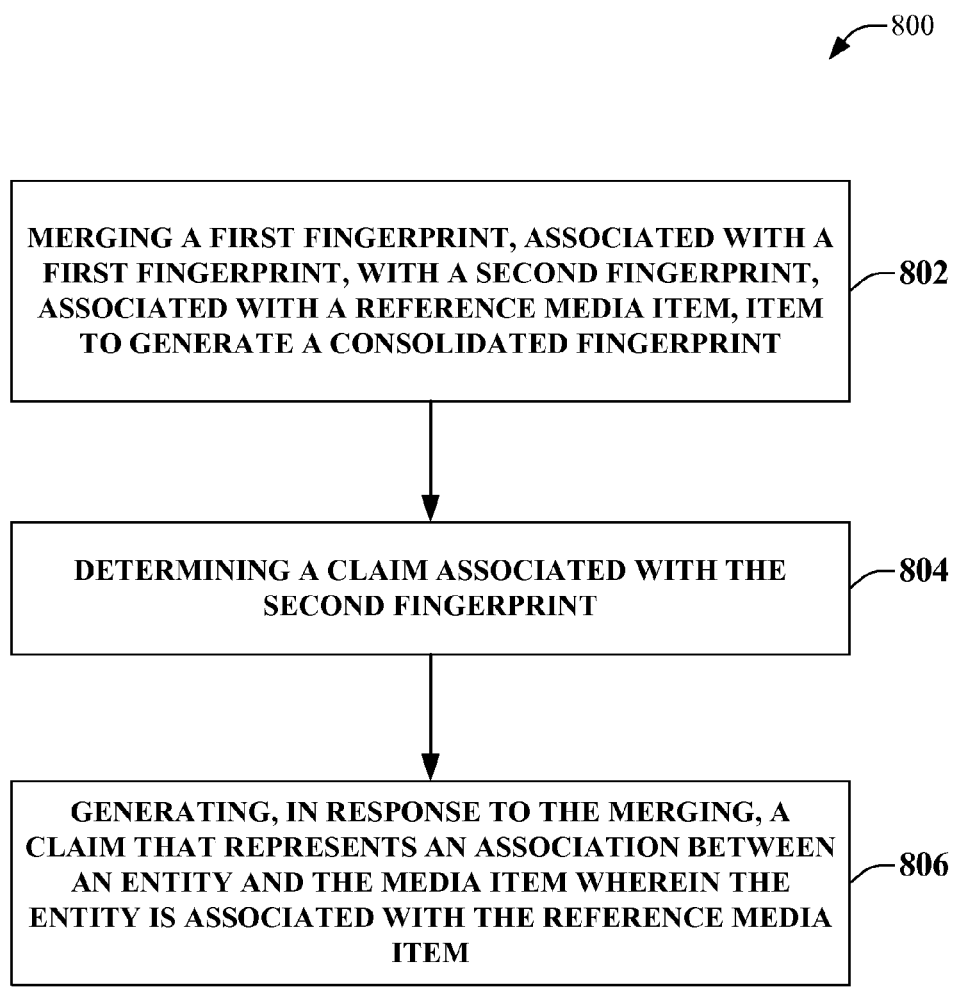
FIG. 8 illustrates a flow diagram of an example, non-limiting embodiment for merging fingerprints and processing claims to media items in accordance with various aspects and implementations described herein.

FIGS. 6-8 illustrate various methodologies 600, 700, and 800 in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices. The methods in FIGS. 6-9 can be implemented for example by systems 100, 300, and 400, illustrated in FIGS. 1, 3, and 4 respectively.

Referring now to FIG. 6, illustrated is an example method 600 for a merging media item fingerprints in accordance with various aspects described in this disclosure.

At reference numeral 602, the method initiates with receiving (e.g., by the fingerprint component 110) data describing a media item. The data describing the media item can be a complete media item, a partial media item, a compact descriptor, a fingerprint, and/or a partial fingerprint, for example. In an aspect, the data describing the media item can be received from a data store, a computing device, and the like.

At reference numeral 604, a system can determine (e.g., via the fingerprint component 110) a first fingerprint associated with the media item that represents data identifying at least a portion of the media item. It is noted that the first fingerprint can be determined based on various fingerprinting techniques (e.g., hashing) and/or received from a memory. In another aspect, the first fingerprint can be determined based on a fingerprinting technique used on a reference media item to generate a reference fingerprint.

At reference numeral 606, a system can merge (e.g., via the consolidation component 120) the first fingerprint with a second fingerprint, associated with a reference media item, item to generate a consolidated fingerprint. In an aspect, the merging can comprise selecting one of the first fingerprint and/or the reference fingerprint as the consolidated fingerprint. In another aspect, the merging can comprise selecting portions of the first fingerprint and the reference fingerprint for the consolidated fingerprint. In another aspect, a consolidated fingerprint can be determined based on generating a disparate fingerprint that represents a combination of the media item and the reference media item. As an example, portions of the media item and the reference media item can be selected and a consolidated fingerprint can be generated based on the selected portions.

Referring now to FIG. 7, illustrated is an example method 700 for a fingerprint merging system using an analysis of media item variances in accordance with various aspects described in this disclosure.

At reference numeral 702, a system can temporally align (e.g., via the comparison component 330) a first representation of the media item and a second representation of the reference media item, based on characteristics of the media item and the reference media item. In an aspect, a common timeline can be determined based on characteristics of media items and/or fingerprints associated with media items.

At reference numeral 704, a system can determine (e.g., via the comparison component 330) a level of difference based on a comparison of the temporally aligned representations of the media items. It is noted that a level of difference can represent a level of disparate bits, difference in color, hue, length and the like. It is further noted that the system can normalize the media items and/or fingerprints. Normalizing can involve noise reduction and/or altering media item characteristics (e.g., altering color, brightness, volume, sound frequencies, and the like).

At reference numeral 706, a system can determine (e.g., via the comparison component 330) whether a first fingerprint and a second fingerprint respectively comprise data associated with a common time. As an example, with reference to FIG. 2, the system can determine the media item 220 comprises additional data in comparison to reference media item 210.

At reference numeral 708, a system can merge (e.g., via the consolidation component 320) the first fingerprint and the second fingerprint based on the determined level of difference and the determining whether the first fingerprint and the second fingerprint respectively comprise data associated with a common time.

Referring now to FIG. 8, illustrated is an example methodology 800 for a matching system using an analysis of discriminative regions in accordance with various aspects described in this disclosure.

At reference numeral 802, a system can merge (e.g., via the consolidation component 420) a first fingerprint, associated with a first fingerprint, with a second fingerprint, associated with a reference media item, item to generate a consolidated fingerprint.

At reference numeral 804, a system can determine (e.g., via the claim component 430) a claim associated with the second fingerprint. It is noted that a claim can be stored in a memory and/or received based on user input. In another aspect, a claim can be automatically determined based on analysis of a reference media item.

At reference numeral 806, a system can generate (e.g., via the claim component 430), in response to the merging, a claim that represents an association between an entity and the media item wherein the entity is associated with the reference media item. In an implementation, a user can provide input associated with claiming the first media item.

In another implementation, method 800 can comprise generating a message to alert an entity that the media item is related to the reference media item. In an aspect, the entity can be an entity that is associated with a claim to the reference media item. In response to generating the message, the system can receive input (e.g., via the claim component 430) regarding the claim. The system, can in response to receiving input, determine whether the media item is claimed by the entity.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Figure 9:
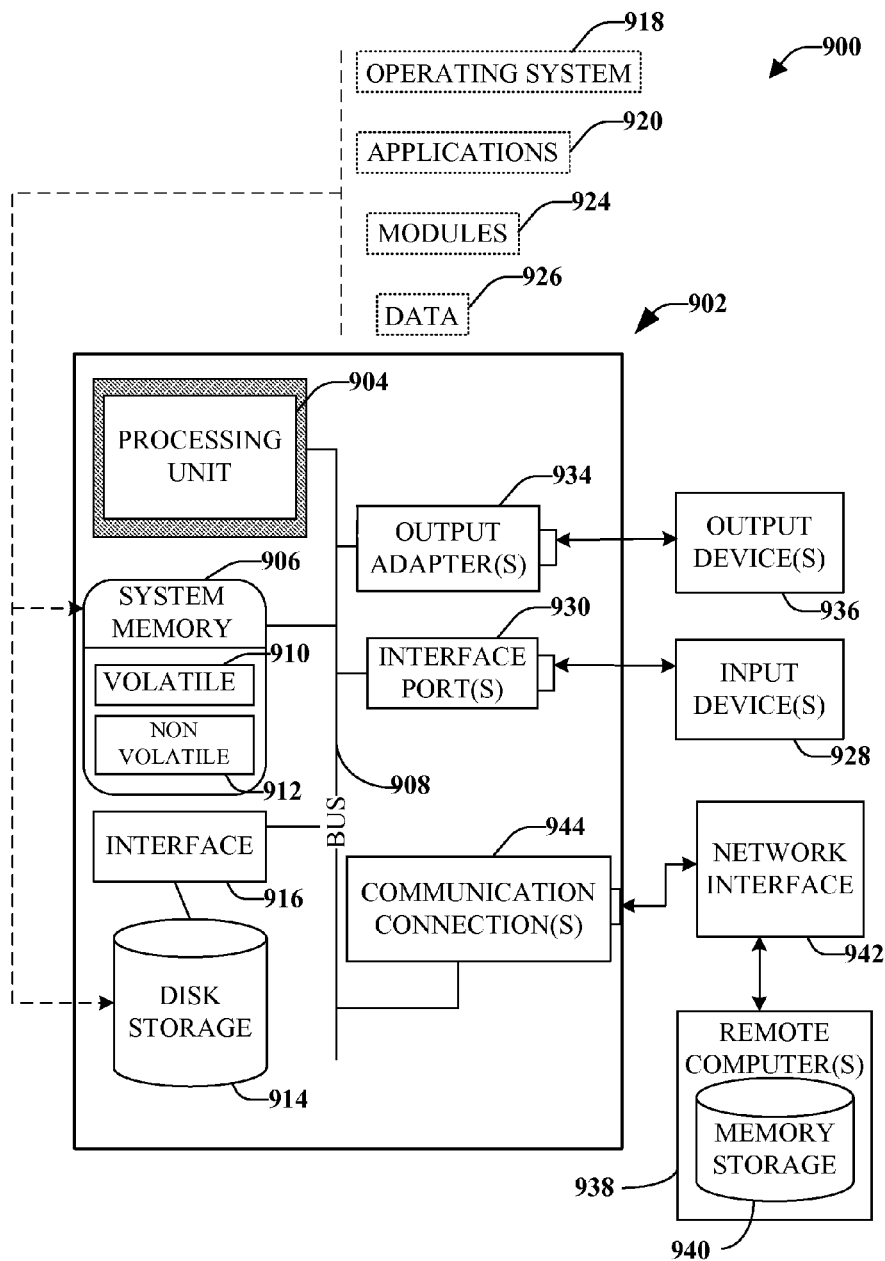
FIG. 9 is a block diagram illustrating an example computing device that is arranged in accordance with various aspects and implementations described herein.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software, software in execution, hardware, and/or software in combination with hardware that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems. For example, applications 920 and program data 926 can include software implementing aspects of this disclosure.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, wired and wireless Ethernet cards, hubs, and routers.

Figure 10:
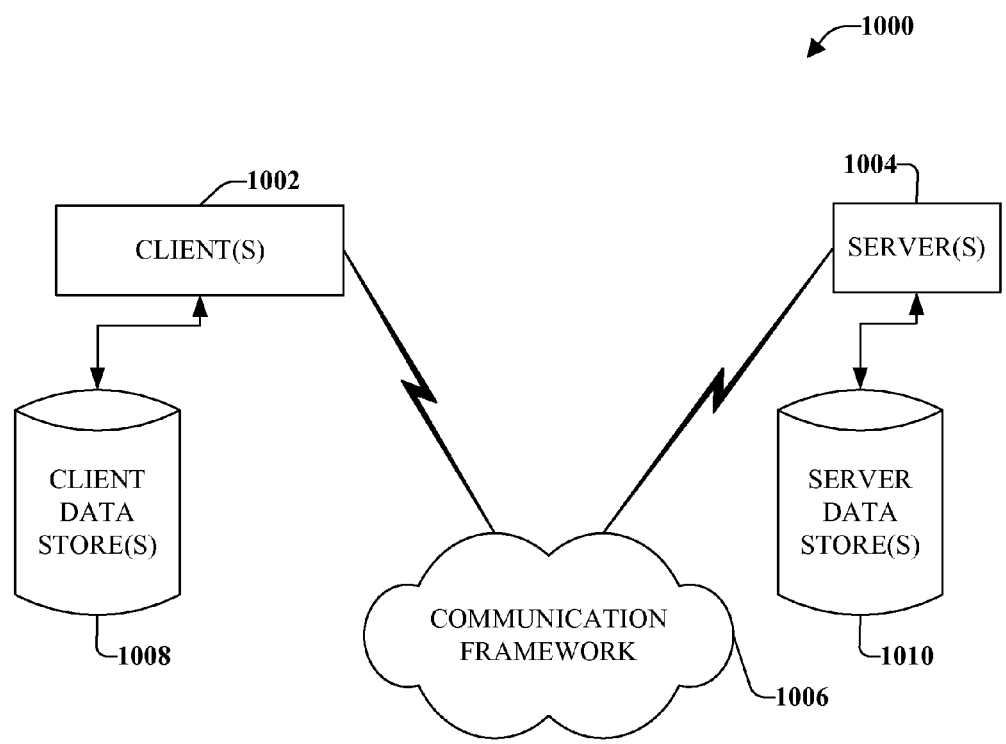
FIG. 10 is a block diagram illustrating an example networking environment in accordance with various aspects and implementations of this disclosure.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet adapted to be transmitted between two or more computer processes wherein data packets may include coded media items and/or media item fingerprints. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one implementation, a client 1002 can transfer an encoded file, (e.g., encoded media item), to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the implementations of this innovation(s). Furthermore, it can be appreciated that many of the various components can be implemented on one or more integrated circuit (IC) chips. For example, in one implementation, a set of components can be implemented in a single IC chip. In other implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than or equal to 20" can include any and all sub-ranges between (and including) the minimum value of zero and the maximum value of 20, that is, any and all sub-ranges having a minimum value of equal to or greater than zero and a maximum value of equal to or less than 20, e.g., 1 to 5. In certain cases, the numerical values as stated for the parameter can take on negative values.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Reference throughout this specification to "one implementation" or "an implementation" or "one embodiment" or "an embodiment" means that a particular feature, structure, or characteristic described in connection with the implementation is included in at least one implementation or at least one embodiment. Thus, the appearances of the phrase "in one implementation" or "in an implementation" or "in one embodiment" or "in an embodiment" in various places throughout this specification are not necessarily all referring to the same implementation/embodiment. Furthermore, the particular features, structures, or characteristics may be combined in any suitable manner in one or more implementations/embodiments.

Further, references throughout this specification to an "item," or "file," means that a particular structure, feature or object described in connection with the implementations are not necessarily referring to the same object. Furthermore, a "file" or "item" can refer to an object of various formats. While referees to media items generally refer to video items (a series of image files with or without audio), it is to be appreciated that media items may be of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., media item fingerprint merging); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system comprising:
   a memory that has stored thereon computer executable components; and
   a processor that executes the following computer executable components stored in the memory:
      a fingerprint component that determines a first fingerprint that represents identified interest points within at least a portion of a media item;
      a comparison component that selects a reference media item based on whether a difference between the media item and the reference media item exceeds a threshold difference level; and
      a consolidation component that:
         determines a time alignment between the first fingerprint and a second fingerprint associated with the reference media item;
         determines, based on the time alignment, that the first fingerprint comprises data associated with a time and the second fingerprint does not comprise data associated with the time and
         merges the first fingerprint with the second fingerprint to generate a consolidated fingerprint including data associated with the time.

2. The system of claim 1, wherein the consolidation component determines, based on the time alignment, whether the first fingerprint and the second fingerprint respectively comprise data associated with a common time.

3. The system of claim 1, wherein the consolidation component, in response to the comparison component determining the difference does not exceed the threshold difference level, selects at least one of data associated with the first fingerprint or data associated with the second fingerprint for generating the consolidated fingerprint.

4. The system of claim 1, wherein the consolidation component, in response to the comparison component determining the difference exceeds the threshold difference level, combines the data associated with the first fingerprint and the data associated with the second fingerprint.

5. The system of claim 1, wherein the comparison component determines a difference between a portion of the media item and a portion of the reference item.

6. The system of claim 1, wherein the first fingerprint represents a partial fingerprint that describes a defined portion of the media item.

7. A method comprising:
   using a processor to execute computer executable components stored on a computer readable medium to perform the following acts:
      determining a first fingerprint associated with a media item that represents identified interest points within at least a portion of the media item;
      selecting a reference media item based on whether a difference between the media item and the reference media item exceeds a threshold difference level;
      determining a time alignment between the first fingerprint and a second fingerprint associated with the reference media item;
      determining, based on the time alignment, that the first fingerprint comprises data associated with a time and the second fingerprint does not comprise data associated with the time and
      merging the first fingerprint with the second fingerprint, to generate a consolidated fingerprint including data associated with the time.

8. The method of claim 7, wherein the merging comprises selecting one of the first fingerprint or the second fingerprint as the consolidated fingerprint.

9. The method of claim 7, the acts further comprising:
   storing the consolidated fingerprint as an associated fingerprint of the media item and removing the first fingerprint.

10. The method of claim 7, the acts further comprising:
    determining a variance level of media items associated with the consolidated fingerprint that represents a level of difference between respective media items of the set of media items.

11. The method of claim 10, the acts further comprising:
    in response to determining the variance level, altering the consolidated fingerprint based on the variance level and altering the set of media items.

12. A computer readable storage device comprising instructions that, in response to execution, cause a system comprising a processor to perform operations, comprising:
    determining a first fingerprint associated with a media item that represents data identifying identified interest points within at least a portion of the media item;
    selecting a reference media item based on whether a difference between the media item and the reference media item exceeds a threshold difference level;
    determining a time alignment between the first fingerprint and a second fingerprint associated with the reference media item;
    determining, based on the time alignment, that the first fingerprint comprises data associated with a time and the second fingerprint does not comprise data associated with the time; and merging the first fingerprint with the second fingerprint to generate a consolidated fingerprint including data associated with the time.

13. The computer readable storage device of claim 12, wherein the operations further comprise:

generating, in response to the merging, a claim that represents an association between an entity and the media item wherein the entity is associated with the reference media item.

14. The computer readable storage device of claim 12, wherein the merging further comprises:

in response to temporally aligning the first fingerprint and the second fingerprint, generating the consolidated fingerprint based on data describing the first fingerprint and data describing the second fingerprint.

\* \* \* \* \*